United States Patent [19]

Sturman

[11] Patent Number: 5,836,230

[45] Date of Patent: Nov. 17, 1998

[54] HIGH SPEED 2-WAY CONTROL VALVE

[75] Inventor: Oded E. Sturman, One Innovation Way, Woodland Park, Colo. 80863

[73] Assignee: Oded E. Sturman, Woodland Park, Colo.

[21] Appl. No.: 703,524

[22] Filed: Aug. 27, 1996

[51] Int. Cl.⁶ ..................................................... F15B 13/04
[52] U.S. Cl. ...................................... 91/455; 251/129.07
[58] Field of Search .......................... 91/455; 251/129.09

[56] References Cited

U.S. PATENT DOCUMENTS

| | | | |
|---|---|---|---|
| 2,393,805 | 1/1946 | Parker | 91/455 |
| 2,404,514 | 7/1946 | McClure | 251/429.07 |
| 3,305,209 | 2/1967 | Bender et al. . | |
| 3,396,751 | 8/1968 | Bender . | |
| 3,458,769 | 7/1969 | Stgampfli . | |
| 3,661,183 | 5/1972 | Komaroff et al. . | |
| 4,096,784 | 6/1978 | Ongaro | 91/455 |
| 4,403,765 | 9/1983 | Fisher . | |
| 4,409,638 | 10/1983 | Sturman et al. | 251/30.02 |
| 5,199,855 | 4/1993 | Nakajima et al. | 251/129.07 |
| 5,584,466 | 12/1996 | Fukano et al. . | |

*Primary Examiner*—F. Daniel Lopez
*Attorney, Agent, or Firm*—Blakely Sokoloff Taylor & Zafman

[57] ABSTRACT

A hydraulic system with control valves that can control the movement of an actuator. The system has a first control valve and a second control valve that each contain solenoids that can switch the valves between open and closed positions. The valves are connected to a digital controller that can energize the solenoids. The controller controls the sequence of energizing such that when the first valve is opened the second valve is closed, and when the second valve is opened the first valve is closed. The valves are connected to the actuator so that the actuator moves in first direction when the first valve is opened and in a second opposite direction when the second valve is opened. The valves have an internal pressure balance that allows the solenoids to quickly switch into the open position using minimal power. The solenoids also have magnets that maintain the valves in the open position when power is terminated.

14 Claims, 5 Drawing Sheets

FIG. 7

HIGH SPEED 2-WAY CONTROL VALVE

BACKGROUND OF THE INVENTION

1. Field of the Invention

The present invention relates to hydraulic actuator systems and control valves that direct the flow of fluid within the system.

2. Description of Related Art

Hydraulic systems typically include actuators that have pistons which move in a forward or rearward direction. The piston has a piston head that separates and defines two actuator chambers. The chambers are connected to control valves and a pump that supplies pressurized fluid to the actuator. The control valves are constructed to allow the pressurized fluid to flow into one of the actuator chambers, while the other chamber is in fluid communication with a reservoir. When one chamber is pressurized, the other chamber drains to the reservoir, wherein the piston moves in a predetermined direction. The valves are also capable of switching the flow of fluid so that the pressurized actuator chamber is connected to the reservoir and the other chamber is in line with the pump. Switching the flow of fluid moves the piston in the opposite direction.

Moving a double chamber linear actuator in two directions typically requires four separate control valves. One set of valves connects one piston chamber to the pump and reservoir, the other set of valves connects the other piston chamber to the pump and reservoir. In a hydraulic system that has numerous actuators, the requirement of four valves per actuator can increase the cost and complexity of the system. When used on an airplane the control valves add undesired weight to the vehicle. It would therefor be desirable to have a hydraulic system that requires only two control valves to operate an actuator.

Some hydraulic systems require an electrical interface for control of the actuators. For example, many aircraft now have "fly by wire" controls, which incorporate a computer to aid in the flight of the plane. The computer provides power to the valves to direct the flow of fluid accordingly. The valves typically contain a solenoid, that when energized allows fluid flow through the valve. The computer can control the movement of the piston by energizing and deenergizing the control valves. Present control valves require a continuous application of power to keep the solenoid energized and the actuator piston extended in one direction. When multiple actuators are used, the computer needs a significant power supply to continuously energize the valves. Such a power supply increases the cost and complexity of the computer and adds undesirable weight to the aircraft. It would therefore be desirable to provide a control valve that would switch and remain in a different position without continuously requiring electrical power.

Some actuators have large output loads, which require very high fluid pressures within the actuator chambers. For example, if the actuators are moving the control surfaces of a high performance aircraft, internal actuator pressures up to 3000 psi are not uncommon. Such pressures must be redirected by the control valves. Control valves typically have an internal valve that is moved by the solenoid between two positions to direct the fluid accordingly. To move the valve, the solenoid usually must overcome the pressure of the fluid. At pressures of 3000 psi, this force can be considerable, such that the solenoid requires a significant amount of electrical power. Additionally, overcoming the inertia of the high pressure fluid decreases the speed and reaction time of the valve. It would therefore be desirable to have a control valve that operates independently of the fluid pressure within the hydraulic system.

SUMMARY OF THE INVENTION

The present invention is a hydraulic systems that includes a pair of control valves that control and operate an actuator. The control valves each have a housing with an inlet port, a first cylinder port, a second cylinder port and a reservoir port. Each valve has a solenoid that moves first and second stems between first and second positions. When the stems are in the first positions, fluid cannot flow through the control valve. When the stems are moved into the second positions, the lower stem allows fluid to flow from the inlet port to the first cylinder port, and the upper stem allows fluid to flow from the second cylinder port to the reservoir port. The incorporation of a separate stems compensates for and reduces the tolerances of the assembly.

The housing has an internal channel that allows the supply fluid to apply a pressure on both the first and second stems. The fluid forces on the stems are opposite and offsetting, such that the solenoid force required to move the stems is independent of the pressure of the fluid. The offsetting fluid channel allows the solenoid to move the stems very quickly and with minimal power. The present valve arrangement therefore provides a high speed valve that can operate in a high pressure environment.

The control valve is typically connected to a supply of power that can energize the solenoid. The solenoid has an armature coupled to the stems to move the same. The solenoid contains a magnet that becomes magnetized when power is supplied to the control valve. The force of the magnet holds the armature and stems in the second position. The control valve thereby only requires power for a small time interval to move the stems from the first to the second positions. There is no need to continuously apply power to the solenoid to retain the valve in the second position. To move the stems back into the first position, a voltage is again supplied to the solenoid. The voltage has a polarity opposite to the voltage used to move the stems into the second position. The reversed polarity voltage induces an opposite charge in the magnet which releases the armature. The stems are then pushed back into the first position by return springs.

The hydraulic system includes an actuator which has an actuator piston that separates a first piston chamber from a second piston chamber. The system also has first and second control valves. The inlet ports of the valves are typically connected to a pump. The reservoir ports are connected to a fluid reservoir which is in line with the pump. The first cylinder port of the first valve is connected to the first piston chamber and the second cylinder port of the first valve is connected to the second piston chamber. The first cylinder port of the second valve is connected to the second piston chamber and the second cylinder port of the second valve is connected to the first piston chamber. When the first control valve is energized, fluid is allowed to flow from the pump and into the first piston chamber, and from the second piston chamber to the reservoir. The flow of fluid moves the actuator piston in a first direction.

To move the actuator piston back in the opposite direction, the first valve is energized with reverse polarity voltage, moving the stems back into the first position. Fluid can no longer flow through the first control valve. The second control valve is also energized, moving the stems and allowing fluid to flow into the second chamber and out of the first chamber.

The control valves can be connected to a computer that provides a series of intelligent signals to the solenoid to control the flow of fluid through the valves. When the valves are connected to an actuator, the processor can provide very precise and programmable control of the movement of the actuator piston.

Therefore it is an object of the present invention to provide a hydraulic system that includes a dual chamber actuator that can be controlled by a pair of control valves.

It is also an object of the present invention to provide a control valve that can switch to a different position without having to continuously supply power to the valve.

It is also an object of the present invention to provide a control valve that can operate independently of the operating pressure of the system.

It is also an object of the present invention to provide a high speed high pressure control valve.

It is also an object of the present invention to provide a control valve that is reliable and inexpensive to produce.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
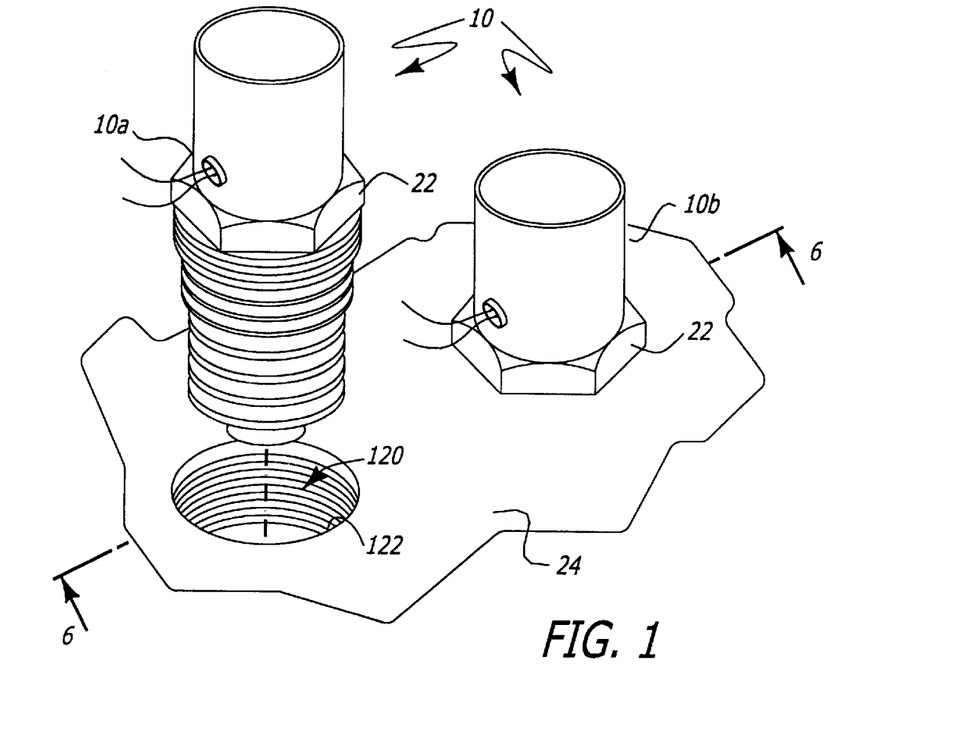
FIG. 1 is a perspective view of a control valve and a manifold.
Figure 2:
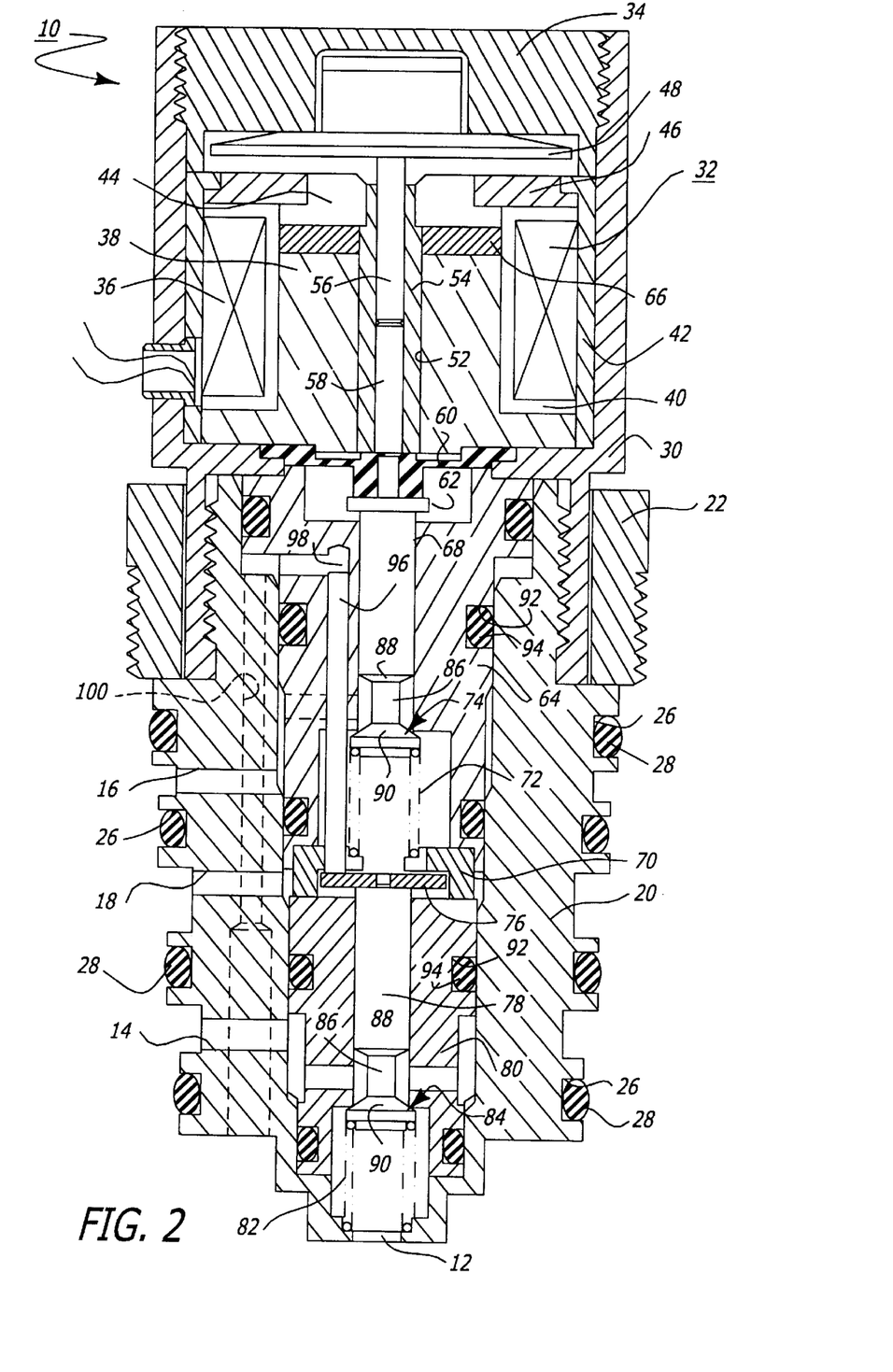
FIG. 2 is a cross-sectional view of the control valve taken at line 2—2 of FIG. 1.

Referring to the drawings more particularly by reference numbers, FIGS. 1 and 2 show a control valve 10 of the present invention. The control valve 10 has an inlet port 12, a first cylinder port 14, a second cylinder port 16 and a reservoir port 18. The cylinder and reservoir ports are drilled into a lower body housing 20. A nut 22 may be attached to the lower housing 20 to provide a means for screwing the valve into a manifold 24. The lower housing 20 may also have four concentric external grooves 26 adapted to retain O-rings 28 that seal the valve 10 to the manifold 24.

The lower housing 20 is connected to an upper housing 30 that contains a solenoid assembly 32. The control valve 10 may also have a cover 34 that screws into the upper housing 30. The cover 34 can be removed to provide access to the solenoid assembly 32. The solenoid assembly 32 includes a coil 36 that extends around a magnetic core 38. The coil 36 is wrapped around a bobbin 40. A magnetic outer pole 42 surrounds the coil 30 and has a portion in contact with the core 38, to provide an area for the magnetic flux to flow therethrough. The outer pole 42 is separated from a magnetic inner pole 44 by an annular spacer 46. The outer and inner poles are both magnetically coupled to an armature 48. A gap 50 normally exist between the poles and the armature 48. The area between the armature 48 and outer pole 42, and between the armature 48 and inner pole 44 are equal so that there is not a restriction in the flow of the magnetic flux. Likewise, the area between the core 38 and the inner pole 44, and the core 38 and the outer pole 42, are also equal to the armature/pole areas to prevent any restriction in flux flow.

The core 30 has a longitudinal bore 52 that has a bushing 54 pressed therein. The bushing 54 guides an armature pin 56 and a diaphragm pin 58, as the pins move relative to the core 38. The diaphragm pin 58 is connected to a diaphragm 60 that seals the solenoid assembly 32.

Figure 3:
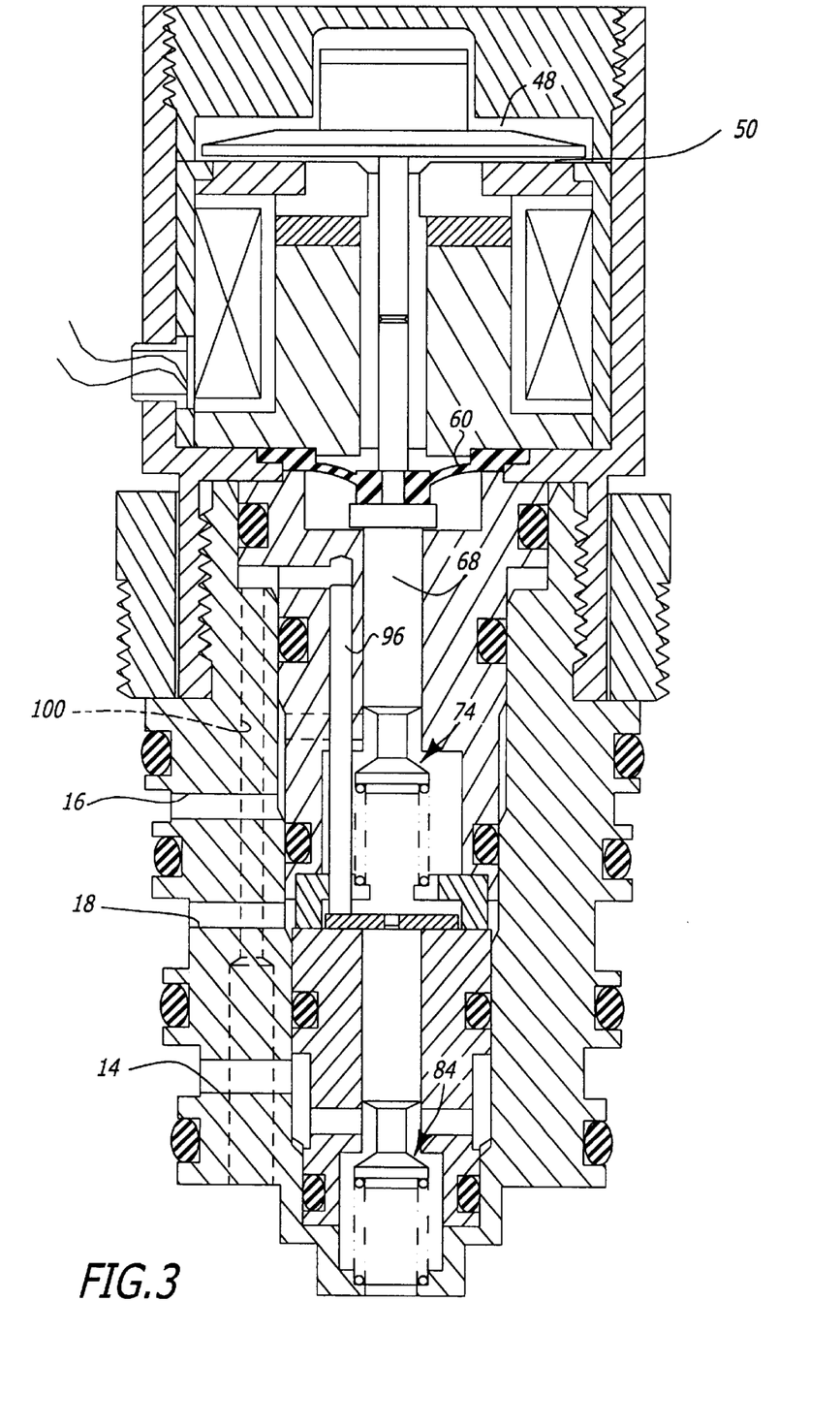
FIG. 3 is a cross-sectional view similar to FIG. 1 showing a solenoid energized and the stems of the valve moved from a first to a second position.

The solenoid assembly 32 is connected to an external power source that supplies power to the coil 36. When a voltage is applied to the coil 36, a magnetic flux is induced in the magnetic core 38. As shown in FIG. 3, the flux flows through the armature and poles, and moves the armature 48 from a first position to a second position. The diaphragm pin 58 has a pin head 62 that engages an upper seat 64 before the armature 48 makes contact with the poles or spacer. The pin head 62 prevents excessive wear on the armature 48 which is typically constructed from a soft iron material.

Between the core 38 and the inner pole 44 is a magnet 66 The magnetic flux magnetizes the magnet 66 and creates a magnetic force which pulls the armature 48 toward the core 38. When power is terminated the magnet 66 maintains an attractive force that keeps the armature 48 in the second position. In this manner, the solenoid 32 does not require a constant supply of power to maintain the armature 48 in the second position.

To release the armature 48, a voltage having a reverse polarity is applied to the coil 36. The reverse polarity of the voltage induces a magnetic flux that flows in the opposite direction. The flux reduces the charge in the magnet 66 until the armature 48 is no longer held by the magnet 66.

Extending through the upper seat 64 is a first stem 68 that is in contact with the diaphragm pin 58. The upper stem 68 can be moved by the diaphragm pin 58 and armature 48 from a first position to a second position. Adjacent to the upper seat 64 is a spring retainer plate 70, that together with the first stem 68 captures a first spring 72. The first spring 72 biases the first stem 68 into the first position. The first stem 68 also has a first valve 74 that controls the flow of fluid between the second cylinder 16 and reservoir 18 ports. As shown in FIG. 2, when the first stem 68 is in the first position the first valve 74 prevents fluid flow between the second cylinder port 16 and the reservoir port 18. As shown in FIG. 3, when the first stem 68 is in the second position, the first valve 74 allows fluid communication between the second cylinder port 16 and the reservoir port 18.

The first stem 68 has a washer 76 that makes contact with a second stem 78 which extends through a lower seat 80. The second stem 78 can be moved by the first stem 68 and armature 48 from a first position to a second position. Captured between the second stem 78 and the lower housing 20 is a second spring 82 which biases the second stem 78 into the first position. The second stem 78 has a second valve 84 that controls the flow of fluid between the inlet port 12 and the first cylinder port 14. When the second stem 78 is in the first position, the second valve 84 prevents fluid from flowing between the inlet port 12 and first cylinder port 14. When the second stem 78 is moved into the second position, fluid is allowed to flow between the first cylinder port 14 and the inlet port 12.

The stems each have neck portions 86 defined by upper 88 and lower 90 seat portions. When the stems are in the first position, the area of the lower seat portion in fluid communication with the cylinder port is equal to the area of the upper seat portion. When the valves are closed, the fluid pressure in the cylinder ports create equal and opposite forces on the seat portions 88 and 90. Because the seat portion areas are equal, the fluid pressure does not bias the valve in either direction. Movement of the stems is thus independent of the fluid pressure within the cylinder ports. The upper and lower seats may also have seal grooves 92 and O-rings 94 that seal the valves, ports and solenoid, accordingly.

The control valve 10 has three balance pins 96 that extend through the upper seat 64 and contact the washer 76 of the first stem 68. A portion of the balance pins 96 are within seat channels 98. The pins 96 and channels 98 are constructed so that the pins 96 can move relative to the upper seat 64. The seat channels 98 are in fluid communication with balance channels 100 that extend through the lower housing 20. The channels 100 are in line with the inlet port 12, so that the pressure of the fluid within the channels 98 and 100 are the same as the pressure in the inlet port 12. The inlet fluid pressure creates a force on the pins 96 that is transmitted to the first 68 and second 78 stems.

The area of the pins 96 is equal to the area of the second stem 78 that is in fluid communication with the inlet port 12, so that the fluid force on the pins 96 is equal and opposite to the fluid force on the second stem 78. The pressure of the inlet fluid on the stems is negated through the pins 96. Therefore the only force needed to move the stems from the first position to the second position, is the energy required to overcome the inertia of the pins and the stems, and the force of the springs. There is no need to overcome the pressure of the fluid at the inlet port. The valve operates independently of the fluid pressure of the system. The reduction in operating force also greatly reduces the power requirements of the solenoid.

Figure 4:
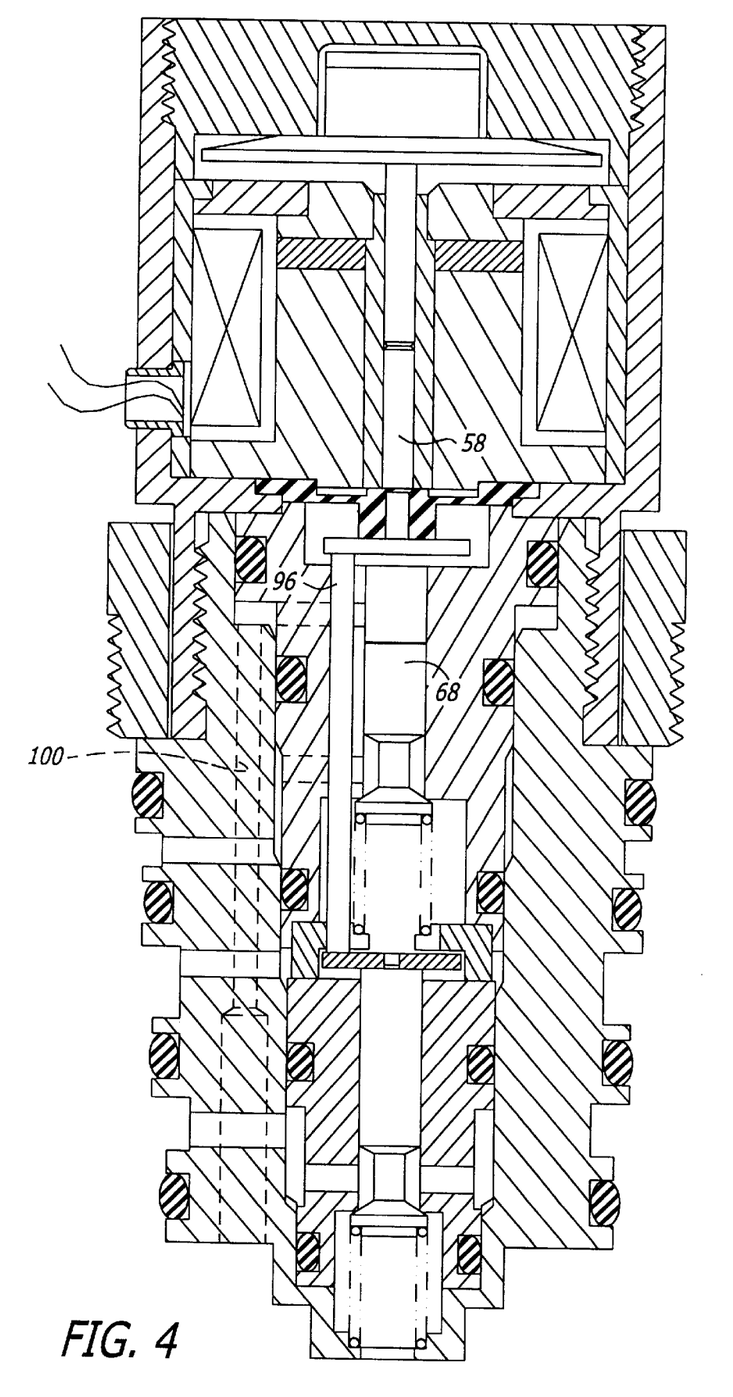
FIG. 4 is a cross-sectional view showing an alternate embodiment of the control valve.

FIG. 4 shows an alternate embodiment wherein the pins 96 are connected directly to the diaphragm pin 58 and the first stem 68 is in fluid communication with the balance channels 100. The area of the first stem 68 is equal to the area of the second stem 78, so that the fluid forces on the stems are equal and offsetting.

In operation, a first voltage with a first polarity is applied to the coil 36. As shown in FIG. 3, the coil 36 induces a magnetic flux which pulls the armature 48 toward the core 38 and moves the stems from the first position to the second position 38. The valves 74 and 84 become unseated so that fluid can flow from the inlet port 12 to the first cylinder port 14, and from the second cylinder port 16 to the reservoir port 18. When electrical power is terminated, the magnet 66 maintains the armature 48 and stems in the second position. A second voltage with a second opposite polarity can then be applied to the coil 36. The second voltage induces a magnetic flux that flows in a second opposite direction. The flux demagnetizes the magnet 66 so that the armature 48 is not attracted to the magnet 66. The force of the first spring 72 moves the first stem 68 and armature 48 back into the original first position. Likewise, the second spring 82 moves the second stem 78 back into the first position. The valves now prevent fluid communication between the ports.

Figure 5:
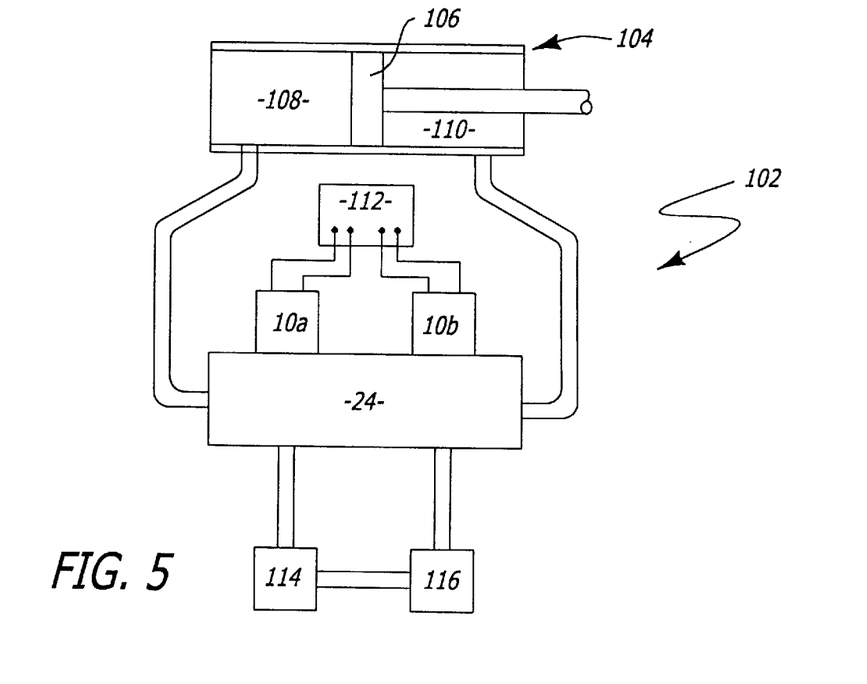
FIG. 5 is a schematic of the control valve of FIG. 1 in a hydraulic system.

FIG. 5 shows a hydraulic system 102 incorporating the control valves 10 of the present invention. Although a hydraulic system is described, it is to be understood that the system can be pneumatic. The system has an actuator 104 that contains a piston 106 that separates a first piston chamber 108 from a second piston chamber 110. Although a linear actuator is shown and described, it is to be understood that any type of fluid controlled actuator may be employed. The actuator 104 is connected to a pair of control valves 10a and 10b. The control valves are connected to a controller 112 that provides digital signals that power the solenoids 32. The controller 112 may contain a processor that energizes and deenergizes the valves in accordance with a computer program. The valves are also connected to a pump 114 and a fluid reservoir 116. Both valves 10a and 10b are attached to a manifold 20 that provides the desired line connections between the valves and the other elements of the system.

Figure 6:
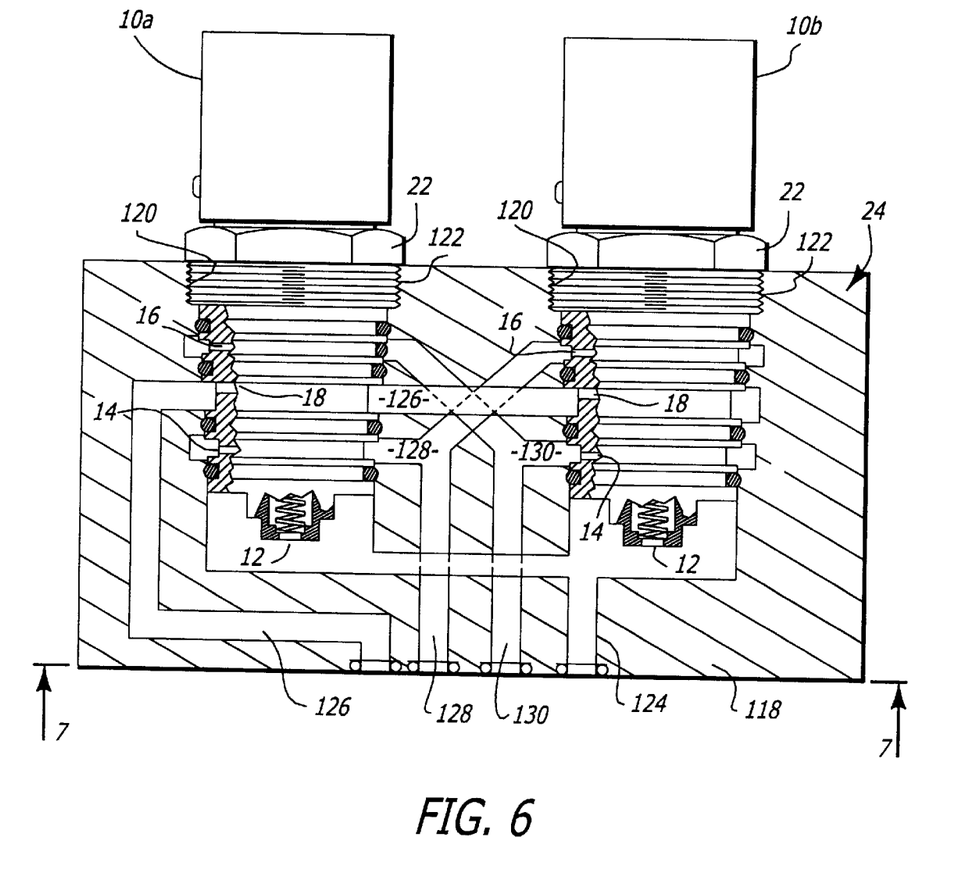
FIG. 6 is a cross-sectional view of a manifold of FIG. 1, taken at line 6—6.
Figure 7:
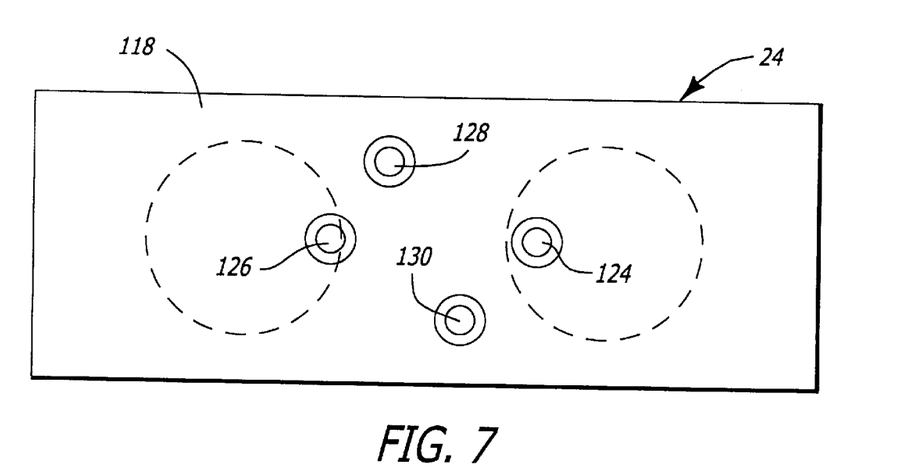
FIG. 7 is a cross-sectional view of a manifold of FIG. 6, taken at line 7—7.

FIGS. 6 and 7 show a preferred embodiment of the manifold 10. The manifold 20 has a block 118 with a pair of cavities 120 that have threaded portions 122 which allow the control valves to be screwed into the manifold 20. The cavities 120 have a step configuration which capture the O-rings and seal the valves. The manifold 120 has a supply line 124 that is connected to the pump 114 and the inlet ports 12 of each control valve. The supply line 124 also provides fluid communication with the channels 100 of the valves to maintain internal pressure balance. The block 118 has a reservoir line 126 that connects the fluid reservoir 116 to the reservoir ports 18 of the valves.

The manifold 20 has a first chamber line 128 in line with the first piston chamber 108 of the actuator. The first line 128 is connected to the first cylinder port 14 of the first valve 10a and the second cylinder port 18 of the second valve 10b. The manifold 20 also has a second chamber line 130 in line with the second piston chamber 110 of the actuator. The second line 130 is connected to the second cylinder port 18 of the first valve 10a and the first cylinder port 14 of the second valve 10b.

In operation, the controller 112 provides power to the first valve 10a, which allows fluid to flow from the pump 114 to the first piston chamber 108. Energizing the valve also allows fluid to flow out of the second piston chamber 110 into the reservoir 116. This flow of fluid moves the piston 106 in a first direction. The piston 106 typically moves until it reaches an extended position. When power is terminated, the internal magnet 66 keeps the valves in the "open" state and the actuator piston 106 is maintained in the extended position. There is no need to continuously provide power to the valves.

To move the piston 106 back into the original retracted position both valves are momentarily energized. The first valve 10a is powered with a voltage having an opposite polarity, which demagnetizes the magnet 66, such that the valve stems are returned to the original positions. Movement of the first control valve stems prevents fluid flow from the pump 114 to the first piston chamber 108, and from the second piston chamber 110 to the reservoir 116. The second valve 10b is energized to open the valve stems, which allows fluid to flow from the pump 114 to the second piston chamber 100 and from the first piston chamber 108 to the reservoir 116. This flow of fluid causes the actuator piston 106 to move in a second opposite direction. To move the actuator piston again, both valves must be energized accordingly (second valve receives reverse polarity voltage). The controller 112 is adapted to provide the opposite voltage polarities. Thus what is described is a system that can control the movement of an actuator with a pair of control valves and a digital controller.

While certain exemplary embodiments are described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A valve that directs the flow of a fluid having a fluid pressure, comprising:
   a housing having an inlet port, a first cylinder port, a second cylinder port and a reservoir port;
   valve means within said housing for allowing fluid communication between said first cylinder port and said inlet port, and between said reservoir port and said second cylinder port when said valve means is moved from a first position to a second position;
   a pin that is in fluid communication with said inlet port and coupled to said valve means such that a first fluid force acts on said pin and is an only force transmitted through said pin to said valve means; wherein there is a second fluid force acting on said valve means, such that the first and second fluid forces are equal and opposite; and,
   a solenoid operatively connected to said valve means to move said valve means between said first and second positions, said solenoid having a magnet to hold said valve means in said second position.

2. The valve as recited in claim 1, wherein said solenoid moves said valve means from said first position to said second position when a voltage with a first polarity is applied to said solenoid, said voltage magnetizes said magnet such that said magnet holds said valve means in said second position, said solenoid moves said valve means from said second position to said first position when a voltage with a second opposite polarity is applied to said solenoid.

3. The valve as recited in claim 1, wherein said valve means includes a first stem connected to a second stem, said first stem being operatively connected to an armature of said solenoid that moves said first and said second stems between first and second positions, said first stem having a first valve that allows fluid communication between said reservoir port and said second cylinder port when in said second position, said second stem having a second valve that allows fluid communication between said inlet port and said first cylinder port when in said second position.

4. The valve as recited in claim 3, wherein said pin is in contact with said first stem, said housing having a channel that provides fluid communication between said inlet port and said pin, said pin and said second stem being constructed such that the fluid forces on said stems are equal and offsetting.

5. The valve as recited in claim 3, wherein said valve means includes a first spring operatively connected to said first stem to bias said first stem and said armature into said first position, and a second spring operatively connected to said second stem to bias said second stem into said first position.

6. A valve that directs the flow of a fluid having a fluid pressure, comprising:
   a housing having an inlet port, a first cylinder port, a second cylinder port and a reservoir port;
   a solenoid having an armature that can move between a first position and a second position;
   a first stem operatively connected to said armature to move between first and second positions,
   wherein said first stem allows fluid communication between said second cylinder port and said reservoir port when said stem is in said second position;
   a second stem operatively connected to said first stem to move between first and second positions,
   wherein said second stem allows fluid communication between said first cylinder port and said inlet port when said second stem is in said second position: and,
   a pin that is in fluid communication with said inlet port and in contact with said first stein such that a first fluid force acts on said pin and is an only force transmitted through said pin to said first stem;
   wherein there is a second fluid force acting on said stems, such that the first and second fluid forces are equal and opposite.

7. The valve as recited in claim 6, further comprising a first spring operatively connected to said first stem to bias said first stem and said armature into said first position, and a second spring operatively connected to said second stem to bias said second stem into said first position.

8. The valve as recited in claim 6, wherein said solenoid has a magnet to maintain said armature in said second position.

9. The valve as recited in claim 8, wherein said solenoid moves said valve means from said first position to said second position when a voltage with a first polarity is applied to said solenoid, said voltage magnetizes said magnet such that said magnet holds said valve means in said second position, said solenoid moves said valve means from said second position to said first position when a voltage with a second opposite polarity is applied to said solenoid.

10. A system, comprising:
   an actuator having an actuator piston that separates a first piston chamber from a second piston chamber, said actuator being constructed such that said piston moves in a first direction when said first piston chamber is pressurized and moves in a second opposite direction when said second piston chamber is pressurized;
   a source of pressurized fluid;
   a fluid reservoir;
   a first control valve that includes;
      a first housing having an inlet port connected to said source of pressurized fluid, a first cylinder port connected to said first piston chamber, a second cylinder port connected to said second piston chamber and a reservoir port connected to said fluid reservoir;
      first valve means within said first housing for allowing fluid communication between said first cylinder port and said inlet port, and between said reservoir port and said second cylinder port when said first valve means is moved from a first position to a second position;
      a pin that is in fluid communication with said inlet port and coupled to said first valve means such that a first fluid force acts on said pin and is an only force transmitted through said pin to said first valve means; wherein there is a second fluid force acting on said first valve means, such that the first and second fluid forces are equal and opposite
      a first solenoid operatively connected to said first valve means to move said first valve means between said first and second positions;
   a second control valve that includes;
      a second housing having an inlet port connected to said source of pressurized fluid, a first cylinder port connected to said second piston chamber, a second cylinder port connected to said first piston chamber and a reservoir port connected to said fluid reservoir;

second valve means within said second housing for allowing fluid communication between said first cylinder port and said inlet port, and between said reservoir port and said second cylinder port when said second valve means is moved from a first position to a second position;

a pin that is in fluid communication with said inlet port and coupled to said second valve means such that a first fluid force acts on said pin and is an only force transmitted through said pin to said second valve means; wherein there is a second fluid force acting on said second valve means, such that the first and second fluid forces are equal and opposite; and a second solenoid operatively connected to said second valve means to move said second valve means between said first and second positions.

11. The system as recited in claim 10, wherein each solenoid has a magnet that maintains said valve means in said second positions.

12. The system as recited in claim 11, wherein said solenoids move said valve means from said first position to said second position when a voltage with a first polarity is applied to said solenoids, said voltage magnetizes said magnet such that said magnets hold said valve means in said second positions, said solenoids move said valve means from said second position to said first position when a voltage with a second opposite polarity is applied to said solenoids.

13. The system as recited in claim 10, wherein said valve means each include a first stem connected to a second stem, said first stem being operatively connected to an armature of said solenoid that moves said first and said second stems between first and second positions, said first stem having a first valve that allows fluid communication between said reservoir port and said second cylinder port when in said second position, said second stem having a second valve that allows fluid communication between said inlet port and said first cylinder port when in said second position.

14. The system as recited in claim 13, wherein said pin is in contact with said first stem, said housings each having a channel that provides fluid communication between said inlet port and said pin, said pin and said second stem being constructed such that the fluid forces on said stems are equal and offsetting.

* * * * *